UNITED STATES PATENT OFFICE 2,690,969

HEALTH PROMOTING CULTURE

Peter P. Pascale, Lonsdale, R. I.

No Drawing. Application January 15, 1952,
Serial No. 266,595

3 Claims. (Cl. 99—4)

My present invention relates to biological cultures, and more particularly to a health promoting culture for animals, such as poultry, etc.

The principal object of the present invention is to provide a culture for building up the strength, weight and resistance of animals, such as poultry.

Another object of the present invention is to provide a health promoting culture to supplement the diet of animals, such as poultry, etc.

With the above and other objects and advantageous features in view, my invention consists of a novel culture and a novel method of preparing the same, more fully disclosed in the detailed description following and more particularly defined in the appended claims.

Various types of biological cultures have been heretofore prepared for the purpose of promoting the health of poultry and other animals. The principal object of adding such cultures to the normal diet of the animal is to build up its resistance to common diseases and to promote its growth.

The applicant has found that a complex culture formed from certain basic food elements will produce startling results in both disease resisting qualities and in building up the body and weight of the animal. In preparing the culture, it should be understood that substitutions, additions and subtractions may be made from the formula set forth herein.

The basic elements of applicant's culture are clover, alfalfa, wheat, rye, corn and sunflower. To these are added chicken fat, eggs and milk. For example, the applicant mixes the seeds only of the following substances, all measurements being in liquid ounces:

|  | Ozs. |
|---|---|
| Clover | 1 |
| Alfalfa | 1 |
| Wheat | 2 |
| Rye | 4 |
| Corn | 3 |
| Sunflower | 3 |

To the above, I now add:

|  | Ozs. |
|---|---|
| Milk | 2 |
| Chicken fat | 1 |
| 2 eggs | |

To promote the action five and three-fourths grams of lime (calcium hydroxide) are also added to the mixture. After being finely ground and thoroughly mixed together, two grams of the mixture are placed in one gallon of water and allowed to stand at normal room temperatures until the pH reading is between 6 and 8. This will take between 60-90 days. At this point, the water or liquid should have a greenish tint indicating that the culture is ready. The mixture is then filtered until all solid material and odors are removed.

The above cultured water can then be added to the drinking water of poultry or other animals in the desired strength. For example, eight ounces can be added to the drinking water of 100 birds three times a week.

I have found that a culture prepared as in the above example and fed to baby chicks in the proportions given will materially increase their body resistance and growth. Tests have shown that, whereas the normal growth of chicks on standard feeds would be a little over 3 pounds in 12 weeks, the addition of applicant's culture increases the growth to the amount of over three pounds in the short period of nine weeks. Furthermore, the birds are highly resistant to the normally fatal diseases to which they are subject, and while they may get the disease, the mortality rate is materially reduced.

The proportions given in the above example may be varied. For example, another effective culture utilizes the following formula, the measurements again being given in liquid ounces:

| | |
|---|---|
| Clover | 1 oz. |
| Alfalfa | 2 ozs. |
| Wheat | 1½ ozs. |
| Rye | 1 oz. |
| Corn | 1½ ozs. |
| Sunflower | 1½ ozs. |
| Milk | 2 ozs. |
| Chicken fat | 3 ozs. |
| 2 eggs | |
| Lime (calcium hydroxide) | 5¾ grams |

Again the ground mixture is placed in water in the proportion of two grams of the mixture to one gallon of water and allowed to stand from 60-90 days or until the pH is between 6 and 8 and the water is greenish in color. To facilitate the formation of the culture, a small quantity of previously finished culture may be added to the new mixture in the beginning of the operation.

The above process can be carried out in a clear glass tank or jug. However, as it begins to ripen after 60 days, the culture may have a tendency to separate from the liquid content and form on the walls of the jug. To prevent this, the mixture should be transferred to an earthenware crock which is approximately one-fourth full of a previously finished mixture. I have found that by draining only three-quarters of the finished mixture and adding the new batch to the old batch, this separation is arrested and the mixture remains clear.

In dealing with various mixtures to which egg is added, it has sometimes been found that an objectionable odor emanates from the culture after it has been allowed to stand for a considerable period of time. Furthermore, the filtering operation takes time and must be carefully handled so that the essential elements of the culture are not also filtered out. I have, therefore, devised an alternate method of preparing the culture which will eliminate the objectionable odor and the filtering. The seeds are mixed in the following proportions:

|  | Grams |
|---|---|
| Clover | 4 |
| Alfalfa | 8 |
| Wheat | 4 |
| Corn | 4 |
| Rye | 2 |
| Sunflower | 8 |

To the above mixture of seeds, I now add:

| | |
|---|---|
| Lime | 2 grams |
| Milk | 1 fluid oz. |
| Chicken fat | 1 oz. |
| 2 egg yolks | |

The mixture is now fortified with:

|  | Ozs. |
|---|---|
| Previously prepared culture | 2 |
| Coal dust | 2 |
| Cement | 3 |
| Sand | 3 |

The above mixture is ground and then molded into a 60 gram capsule and allowed to dry for approximately five days. The addition of cement and sand will allow the mixture to form a solid cake or capsule. The coal will assist in eliminating the objectionable odors. The capsule is then placed in a gallon of water and again allowed to stand from 60–90 days or until the pH reading is between 6 and 8 and the water is greenish. The cultured water prepared in this way now needs no filtering, as the solid capsule can be lifted out.

The above formula can be varied by increasing the egg yolks to three instead of two and additional finished culture, if desired.

Tests conducted on the above culture indicate that besides the food value extracted from the seed content, the culture probably contains a mixture of vitamin $B_{12}$ and chlorophyll. The nutritive body building and disease resisting qualities produced by such a combination have been recognized in this art. However, it is believed that the applicant has been the first to produce a culture combining these elements.

As stated hereinabove, other types of seeds with similar nutritive value may be substituted for those given in the examples hereinabove set forth. Furthermore, good results may also be obtained by omitting some of the listed seeds. The chicken fat may also be eliminated. However, I have found that the addition of the chicken fat tends to keep the small particles in the solution longer, instead of them dropping to the bottom.

When the culture has been standing for a period of time and the greenish color does not begin to appear because the pH reading fails to return to neutral, small quantities of previously finished culture may be added to the mixture to assist it in fully ripening.

The process thus resolves itself into four distinct steps. In step 1, ordinary faucet water is put into the tank or container and allowed to stand 3–5 days before using. In step 2, the formula is ground and thoroughly mixed, either by hand or mechanically. In making the solid cake, the mixture can be poured into a flat pan and spread to about three-eighths inch thick. It is then put out in sunlight and allowed to dry. After drying it can be cut into squares or approximately two grams each. In step 3, an ordinary clear gallon jug is filled with the water and the two gram block of food is put into the water. The jug is then kept at room temperature, preferably in sunlight. The temperature of the room should be 70° or over. This should be left to stand for 60 days. In the fourth and final step, the mixture should be transferred to an earthenware crock which is already one quarter full of a finished mixture. Shortly thereafter the mixture should begin to turn a light greenish color, indicating that it is ripening. A check of the pH reading and of its color should show when the mixture is completely finished.

The above invention, therefore, provides a health promoting culture which builds up the physical properties of animals, such as poultry, and increases their resistance to disease.

Other advantages and uses of the above invvention will be readily apparent to a person skilled in the art.

I claim:

1. A compound for forming a health promoting culture comprising a mixture of the seeds of clover 4 grams, alfalfa 8 grams, wheat 4 grams, corn 4 grams, rye 2 grams, sunflower 8 grams, added to lime 2 grams, milk 1 fluid ounce, chicken fat 1 ounce, 2 egg yolks, coal dust 2 ounces, cement 3 ounces, sand 3 ounces, and previously prepared culture 2 ounces.

2. The method of forming a health promoting culture comprising the steps of finely grinding the seeds of clover, alfalfa, wheat, rye, corn and sunflower, adding milk, fat, eggs and calcium hydroxide, thoroughly mixing the ingredients, placing two grams of the mixture in one gallon of water, allowing the water to stand between 60–90 days and until the water is greenish and the pH reading is between 6 and 8, and filtering the water until the solid material and the odors are removed.

3. The method of forming a health promoting culture comprising the steps of mixing the seeds of clover, alfalfa, wheat, corn, rye and sunflower, adding milk, fat, egg yolks and lime, adding coal dust, cement, sand and previously prepared culture, finely grinding the mixture, molding the mixture into a 60 gram capsule and allowing it to dry for approximately five days, placing the capsule in a gallon of water and allowing it to stand from 60–90 days until the water is greenish and the pH reading is between 6 and 8, and then removing the capsule.

References Cited in the file of this patent

UNITED STATES PATENTS

| Number | Name | Date |
|---|---|---|
| 1,807,043 | Maybee | May 26, 1931 |
| 2,168,138 | Sakurai | Aug. 1, 1939 |
| 2,194,672 | Porter | Mar. 26, 1940 |
| 2,254,241 | Pittman | Sept. 2, 1941 |
| 2,450,318 | Wagamon | Sept. 28, 1948 |